March 31, 1936.　　　　S. STERLING　　　　2,035,846

MULTIFOCAL LENS

Filed Nov. 12, 1932

SCOTT STERLING
INVENTOR

BY *J. A. Ellestad*

ATTORNEY

Patented Mar. 31, 1936

2,035,846

UNITED STATES PATENT OFFICE 2,035,846

MULTIFOCAL LENS

Scott Sterling, Rochester, N. Y., assignor to Bausch & Lomb Optical Company, Rochester, N. Y., a corporation of New York Application November 12, 1932, Serial No. 642,399

1 Claim. (Cl. 88—54)

This invention relates to ophthalmic lenses and more particularly it has reference to ophthalmic lenses which are provided with a plurality of vision fields.

One of the objects of my invention is to provide an ophthalmic lens having a plurality of vision fields which are arranged to provide reading, intermediate and distant visions. Another object is to provide an ophthalmic lens having a near vision field of ample dimensions and a relatively wide intermediate vision field positioned directly above the near vision field. Other objects and advantages reside in certain novel features of construction, arrangement and combination of parts as will be described hereinafter and pointed out in the appended claim.

Referring to the drawing.

Figure 1:
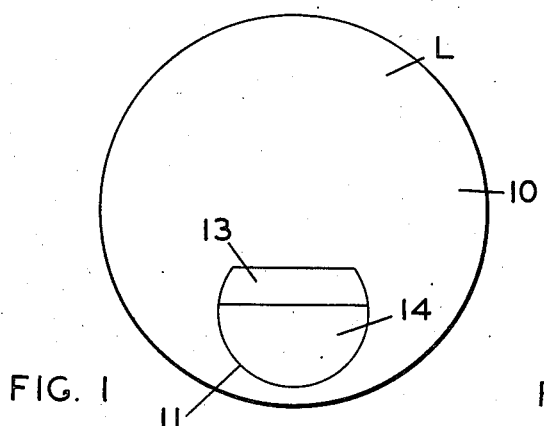
Fig. 1 is a view of a multifocal lens embodying my invention.

A preferred embodiment of my invention is illustrated in the drawing wherein L indicates a finished lens blank comprising a major lens member 10 and the composite disk 11 which is fused in the countersink 12 formed on the major member. The major member 10 may be formed, for example, of a crown glass having a refractive index of 1.523 and the composite disk may comprise an upper flint glass portion 13 having a refractive index of 1.616 and a lower flint glass portion 14 having a refractive index of 1.690. Because of the differences in refractive indices, such a lens will provide three vision fields each having a different power namely the lower reading portion 14, an intermediate vision field 13 and the distance field provided by the major member.

Figure 2:
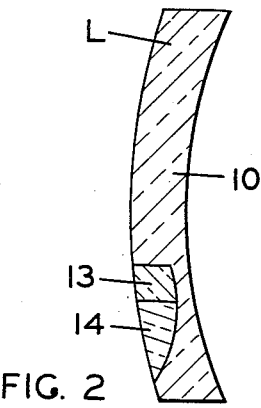
Fig. 2 is a vertical section of same.
Figure 3:
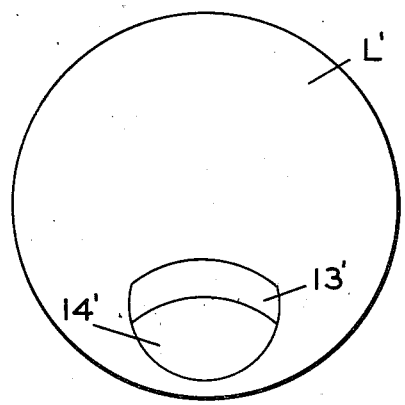
Fig. 3 is a view of a modification of my invention.
Figure 4:
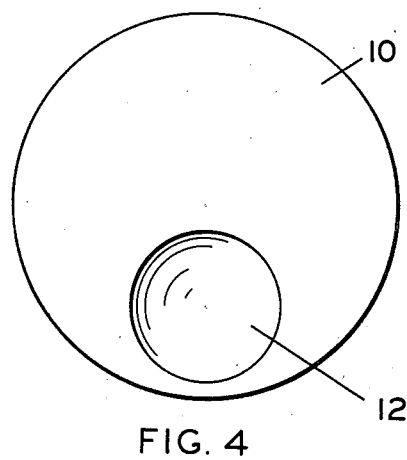
Fig. 4 is a view of a major lens member.
Figure 5:
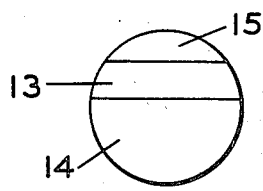
Fig. 5 is a face view of the composite disk.
Figure 6:
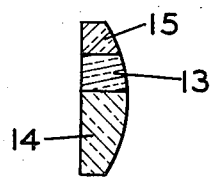
Fig. 6 is a vertical section of same.

In making my improved lens, the composite disk is first provided by fusing edge to edge the three pieces of glass 13, 14 and 15 as shown in Figs. 5 and 6. As previously stated, the portions 13 and 14 may be formed of flint glasses whose refractive indices are 1.616 and 1.690, respectively. The portion 15 may be formed of crown glass having the same refractive index as the major member namely 1.523. This composite disk is then fused into the countersink 12 on the major member 10, as will be apparent to those skilled in the art. Since the portion 15 has the same index as the major member, the two are fused together so as to form a homogeneous member with the result that the arcuate boundary of member 15 disappears. The fused blank is then ground and polished to provide the finished lens, as will be understood by those skilled in the art. This provides the trifocal lens shown in Figs. 1 and 2. Instead of providing the pieces 13, 14 and 15 with substantially straight abutting edges as shown in Fig. 5, I may provide downwardly curved abutting edges on the portions to provide the lens L' having the reading field 14' and the intermediate field 13' as shown in Fig. 3.

From the foregoing, it will be apparent that I am able to attain the objects of my invention and provide an improved fused multifocal lens. Such a lens will have reading and intermediate vision fields of ample dimensions. The refractive indices and kinds of glasses employed can, of course, be suitably chosen so as to provide a lens having the desired optical characteristics, but I have found that the refractive indices given above provide a lens in which the power of the intermediate portion is about five-ninths of that of the reading portion and that this affords maximum comfort to the user. Various modifications can, obviously, be made without departing from the spirit of my invention as pointed out in the appended claim.

I claim:

A multifocal lens comprising a major member, a composite disk fused in a countersink in said member to provide contiguous reading and intermediate vision fields, said disk comprising two pieces of glass fused in edge to edge relation along a downwardly curved line, said member and pieces each having a different refractive index, the lower piece being bounded entirely by said curved line and an arc of a circle which is spaced from the periphery of said major member, the upper piece being bounded entirely by said curved line, another curved line and two arcs of said circle, the combined vertical dimensions of said pieces being greater than the radius but less than the diameter of said circle.

SCOTT STERLING.